United States Patent
Osawa

(10) Patent No.: US 10,442,138 B2
(45) Date of Patent: Oct. 15, 2019

(54) THREE-DIMENSIONAL OBJECT MANUFACTURING METHOD AND THREE-DIMENSIONAL SHAPING APPARATUS

(71) Applicant: CANON KABUSHIKI KAISHA, Tokyo (JP)

(72) Inventor: Hidefumi Osawa, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 140 days.

(21) Appl. No.: 15/525,737

(22) PCT Filed: Nov. 24, 2015

(86) PCT No.: PCT/JP2015/005844
§ 371 (c)(1),
(2) Date: May 10, 2017

(87) PCT Pub. No.: WO2016/088334
PCT Pub. Date: Jun. 9, 2016

(65) Prior Publication Data
US 2017/0326752 A1 Nov. 16, 2017

(30) Foreign Application Priority Data
Dec. 1, 2014 (JP) .................................. 2014-243320

(51) Int. Cl.
*G06F 19/00* (2018.01)
*B29C 64/40* (2017.01)
(Continued)

(52) U.S. Cl.
CPC .............. *B29C 64/40* (2017.08); *B33Y 50/02* (2014.12); *G03G 15/224* (2013.01); *G06T 17/00* (2013.01);
(Continued)

(58) Field of Classification Search
CPC ... B29C 64/40; B26F 3/08; B26F 3/00; G06T 17/00; G06T 19/20; G06T 2219/2021;
(Continued)

(56) References Cited

U.S. PATENT DOCUMENTS 5,595,703 A   1/1997   Swaelens et al.
8,209,044 B2  6/2012   Inoue
(Continued)

FOREIGN PATENT DOCUMENTS

JP   5383687 B2      1/2014
WO   2008/044693 A1  4/2008
WO   2009/047355 A1  4/2009

OTHER PUBLICATIONS

McMains, Sara & Smith, Jordan & Sequin, Carlo. (2003). Thin-Wall Calculation for Layered Manufacturing. J. Comput. Inf. Sci. Eng. . 3. 210-218. 10.1115/1.1604812. (Year: 2003).*
(Continued)

*Primary Examiner* — Michael D Masinick
(74) *Attorney, Agent, or Firm* — Venable LLP

(57) ABSTRACT

An information processing method for generating slice data in a shaping apparatus configured to manufacture a three-dimensional object including a shaping object by sequentially stacking shaping materials based on the slice data generated for each layer, the information processing method including the steps of: acquiring cross-sectional data; judging the presence/absence of a support required region; determining a type of the support to be disposed in the support required region; and generating, as the slice data of a target layer, image data including a structure region indicating the cross-section of the shaping object in the target layer and a support region indicating the cross-section of the support.

15 Claims, 13 Drawing Sheets

(51) Int. Cl.
  *G06T 19/20* (2011.01)
  *G03G 15/22* (2006.01)
  *B33Y 50/02* (2015.01)
  *G06T 17/00* (2006.01)
  *B33Y 50/00* (2015.01)
  *B44B 1/00* (2006.01)
  *B22F 3/105* (2006.01)

(52) U.S. Cl.
  CPC ............ *G06T 19/20* (2013.01); *B22F 3/1055* (2013.01); *B22F 2003/1057* (2013.01); *B22F 2003/1058* (2013.01); *B33Y 50/00* (2014.12); *B44B 1/00* (2013.01); *G06T 2219/2021* (2013.01)

(58) Field of Classification Search
  CPC .......... B33Y 50/02; B33Y 50/00; B44B 1/00; G03G 15/224
  See application file for complete search history.

(56) References Cited

U.S. PATENT DOCUMENTS

| | | | |
|---|---|---|---|
| 8,903,533 B2 | 12/2014 | Eggers et al. | |
| 9,524,357 B1* | 12/2016 | Webster | G06F 17/50 |
| 2005/0074596 A1* | 4/2005 | Nielsen | B29C 64/40 |
| | | | 428/304.4 |
| 2008/0071030 A1* | 3/2008 | Priedeman, Jr. | B29C 64/40 |
| | | | 525/185 |
| 2009/0072447 A1 | 3/2009 | Hull et al. | |
| 2010/0042241 A1 | 2/2010 | Inoue | |
| 2010/0228369 A1 | 9/2010 | Eggers et al. | |
| 2013/0171550 A1* | 7/2013 | Amemori | G03G 9/08755 |
| | | | 430/105 |
| 2014/0182775 A1* | 7/2014 | Taniuchi | B32B 37/02 |
| | | | 156/246 |
| 2014/0300017 A1 | 10/2014 | Wighton et al. | |
| 2015/0151493 A1* | 6/2015 | Schmidt | B29C 64/40 |
| | | | 700/98 |
| 2015/0151494 A1 | 6/2015 | Eggers et al. | |
| 2015/0242564 A1* | 8/2015 | Chang | G05B 19/4099 |
| | | | 700/118 |
| 2016/0067925 A1* | 3/2016 | Warwick | B29C 71/0009 |
| | | | 428/304.4 |
| 2016/0297147 A1 | 10/2016 | Osawa | |

OTHER PUBLICATIONS

Jun. 15, 2017 International Preliminary Report on Patentability in International Patent Appln. No. PCT/JP2015/005844.

Mar. 22, 2016 International Search Report and Written Opinion in International Patent Application PCT/JP2015/005844.

\* cited by examiner

|   |    | B  |    |    |
|---|----|----|----|----|
|   |    | W0 | M1 | S2 |
| A | W0 | 0  | 2  | 2  |
|   | M1 | 1  | 1  | 1  |

Fig.6

THREE-DIMENSIONAL OBJECT MANUFACTURING METHOD AND THREE-DIMENSIONAL SHAPING APPARATUS

TECHNICAL FIELD

The present invention relates to an information processing method, an information processing apparatus, a three-dimensional object manufacturing method, a three-dimensional shaping apparatus and a program.

BACKGROUND

Recently, AM (Additive Manufacturing) techniques to fabricate a shaped product that matches a shaping object by sequentially stacking shaping materials corresponding to cross-sections generated by sectioning a three-dimensional shaping object by parallel planes, are receiving attention.

Various methods are known as AM techniques, but in many methods the shaping object or parts must be fixed on a reference stage by a support during fabrication. This support is used for preventing deformation of the shaping object during fabrication.

This support must maintain sufficient structural strength to withstand gravity and tensile strength, which are applied to the support during fabrication of parts. In particular, the lower side of the portion where the shaping object protrudes (overhanging portion) is a typical region that requires the support to prevent deformation caused by gravity. Hereafter, the portion constituting the shaping object, in the shaped product fabricated by an AM technique, is called a "structure" to distinguish it from the support.

When the fabrication of the shaped product completes, the support must be manually removed from the structure or must be dissolved by a solvent. This removal step is extremely time consuming, and requires considerable care so that the surface of the structure is not damaged during removal.

Further, since the removed support becomes waste, conserving time, energy and materials to fabricate the support is demanded.

PTL 1 discloses various methods to decrease material consumption while maintaining the structural strength of the support.

PTL 2 discloses a method of calculating a support required region, calculating joint points of the structure and the support, and reducing unnecessary support by using a ranking method, which is determined from the joint points by special calculation.

PTL 3 discloses a method of calculating the thickness of the wall of the support using the weight distribution of the shaping object, where the thickness of the wall of the support, corresponding to a portion of which weight per unit volume is large, is made thicker than other portions.

CITATION LIST

Patent Literature

[PTL 1]
U.S. Pat. No. 5,595,703
[PTL 2]
Japanese Patent No. 5383687
[PTL 3]
WO 2008/044693

SUMMARY OF INVENTION

Technical Problem

However, in the conventional method, the following potential problems exist.

In the method of PTL 1 and 2, the support has a same structure regardless the load applied from the top of the support (upper side in direction of gravity). Therefore if the load is lighter than the estimated design value, the support structure has a performance exceeding the specification, and if the load is heavier than the estimated design value, a support that cannot support the weight may be inclined, and the shaping object may be deformed during fabrication. In the case of PTL 3, the structural strength of the support is calculated using only the weight distribution of the shaping object, hence structural strength may be insufficient in the lower part of the support because the weight of the support itself is added, and the shaping object may be deformed. The structural strength also becomes insufficient when pressure is applied during stacking.

With the foregoing in view, it is an object of the present invention to reduce the consumption of materials of the support while preventing deformation of the shaping object during fabrication.

Solution of Problem

A first aspect of the present invention resides in an information processing method for generating slice data in a shaping apparatus configured to manufacture a three-dimensional object including a shaping object by sequentially stacking shaping materials based on the slice data generated for each layer, the information processing method comprising the steps of: acquiring cross-sectional data on a cross-section corresponding to a target layer of the shaping object in order to generate the slice data of the target layer; judging the presence/absence of a support required region, which requires a support for supporting the shaping object, in the target layer, based on the cross-sectional data and a shape of the shaping object located above the target layer; determining, when the support required region is present in the target layer, a type of the support to be disposed in the support required region according to a load correspondence value which indicates the magnitude of a load applied from the top; and generating, as the slice data of the target layer, image data including a structure region indicating the cross-section of the shaping object in the target layer and a support region indicating the cross-section of the support, based on the cross-sectional data and the determined type of the support.

A second aspect of the present invention resides in an information processing apparatus for generating slice data in a shaping apparatus configured to manufacture a three-dimensional object including a shaping object by sequentially stacking shaping materials based on the slice data generated for each layer, the information processing apparatus comprising: an acquiring unit configured to acquire cross-sectional data on a cross-section corresponding to a target layer of the shaping object in order to generate the slice data of the target layer; a judging unit configured to judge the presence/absence of a support required region, which requires a support for supporting the shaping object, in the target layer, based on the cross-sectional data and a shape of the shaping object located above the target layer; a determining unit configured to, when the support required region is present in the target layer, determine a load correspondence value which indicates the magnitude of a load applied from the top, and determine a type of the support to be disposed in the support required region according to the load correspondence value; and a generating unit configured to generate, as the slice data of the target layer, image data including a structure region indicating the cross-section of the shaping object in the target layer and a support region indicating the cross-section of the support, based on the cross-sectional data and the determined type of the support.

A third aspect of the present invention resides in a method for manufacturing a three-dimensional object including a shaping object by sequentially stacking shaping materials based on slice data generated for each layer, steps of generating the slice data comprising the steps of: acquiring cross-sectional data on a cross-section corresponding to a target layer of the shaping object in order to generate the slice data of the target layer; judging the presence/absence of a support required region, which requires a support for supporting the shaping object, in the target layer, based on the cross-sectional data and a shape of the shaping object located above the target layer; determining, when the support required region is present in the target layer, a load correspondence value which indicates the magnitude of a load applied from the top, and determining a type of the support to be disposed in the support required region according to the load correspondence value; and generating, as the slice data of the target layer, image data including a structure region indicating the cross-section of the shaping object in the target layer and a support region indicating the cross-section of the support, based on the cross-sectional data and the determined type of the support.

A fourth aspect of the present invention resides in a method for manufacturing a three-dimensional object including a shaping object by sequentially stacking shaping materials based on slice data generated for each layer, wherein the three-dimensional object includes a structure constituting the shaping object and a support for supporting the structure, and when the three-dimensional object has a plurality of supports separated from each other by the structure, at least two supports of the plurality of supports are formed by mutually different structures respectively.

A fifth aspect of the present invention resides in a three-dimensional shaping apparatus for manufacturing a three-dimensional object including a shaping object by sequentially stacking shaping materials based on slice data generated for each layer, the three-dimensional shaping apparatus comprising: a slice data generating unit configured to generate the slice data, wherein the slice data generating unit includes: an acquiring unit configured to acquire cross-sectional data on a cross-section corresponding to a target layer of the shaping object in order to generate the slice data of the target layer; a judging unit configured to judge the presence/absence of a support required region, which requires a support for supporting the shaping object, in the target layer, based on the cross-sectional data and a shape of the shaping object located above the target layer; a determining unit configured to, when the support required region is present in the target layer, determine a load correspondence value which indicates the magnitude of a load applied from the top, and determine a type of the support to be disposed in the support required region according to the load correspondence value; and a generating unit configured to generate, as the slice data of the target layer, image data including a structure region indicating the cross-section of the shaping object in the target layer and a support region indicating the cross-section of the support, based on the cross-sectional data and the determined type of the support.

A sixth aspect of the present invention resides in a program that causes a computer to execute the respective steps of the information processing method.

Advantageous Effects of Invention

According to the present invention, consumption of materials of the support can be reduced while preventing deformation of the shaping object during fabrication.

Further features of the present invention will become apparent from the following description of exemplary embodiments with reference to the attached drawings.

BRIEF DESCRIPTION OF DRAWINGS

FIG. 6 shows an operation table used when the operation unit in FIG. 5 performs a logic operation.

DESCRIPTION OF EMBODIMENTS

Example 1

Embodiments of the present invention will now be described with reference to the accompanying drawings. The embodiments to be described below are merely concrete examples of the present invention, and are not intended to limit the scope of the invention.

Figure 1:
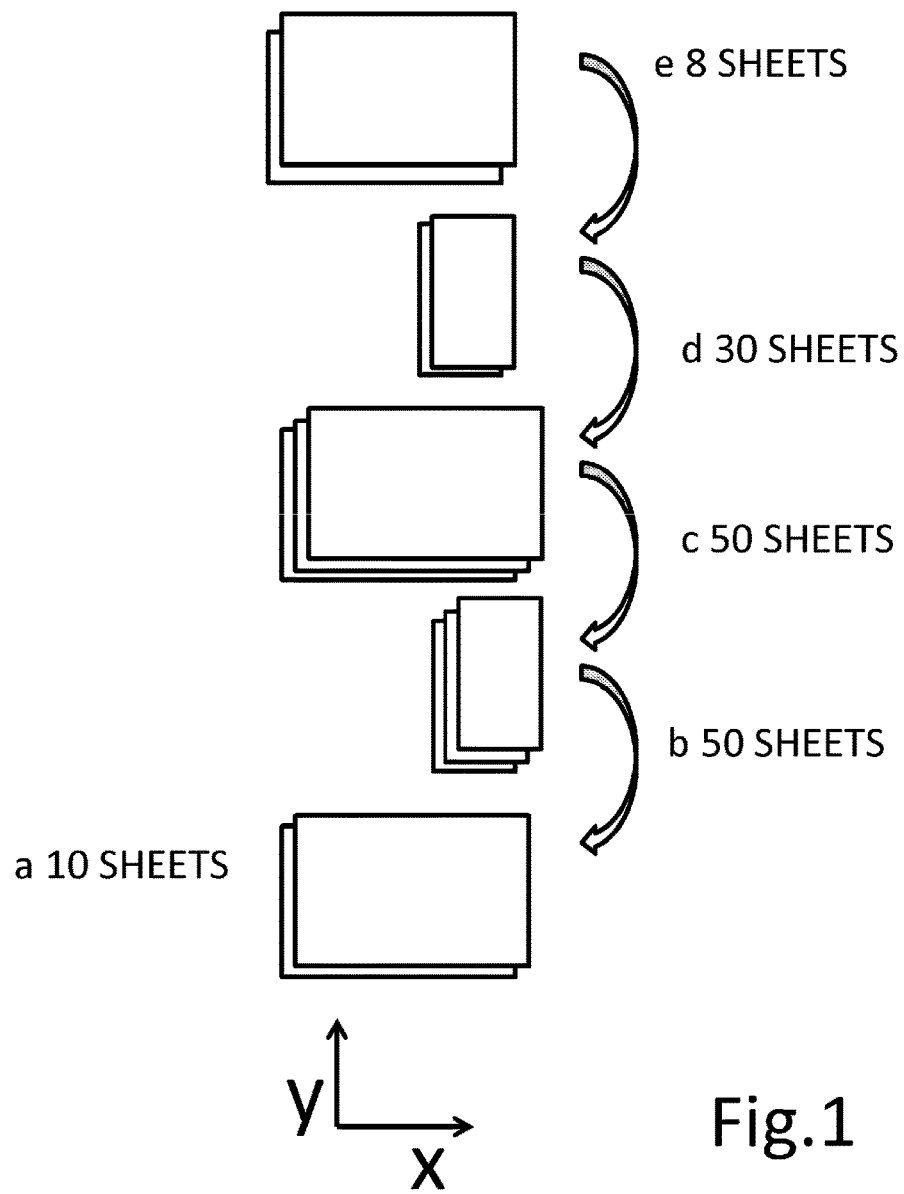
FIG. 1 is a diagram depicting stacking when a sheet stacking apparatus of Example 1 is used.
Figure 2A:
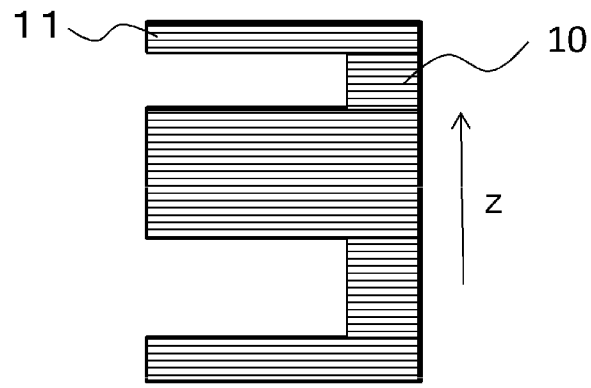
FIGS. 2A and 2B each show a schematic diagram of a shaped product formed by stacking in Example 1.
Figure 2B:
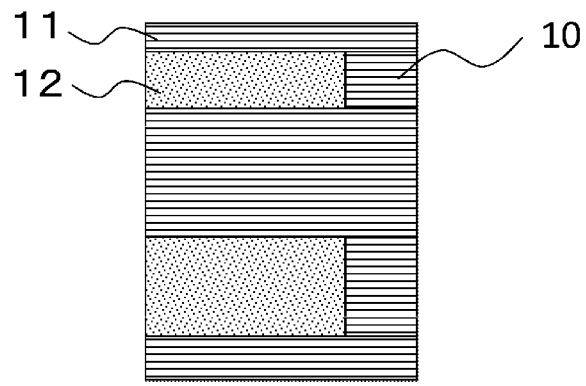

FIG. 1 is a diagram depicting the stacking of the structure portion when a sheet stacking method, which stacks the shaping materials in surface units, is used as an example of a three-dimensional shaping method for forming a three-dimensional shaped product according to this example. FIGS. 2A and 2B show schematic diagrams each depicting a shaped product formed by stacking according to this example. FIG. 2A shows a state when a support does not exist, that is, a structure (shaping object). FIG. 2B shows the structure and support required regions where a support is required to form the shaped product. When the shaping object in FIG. 2A is formed, the support required regions, which are separated by the structure, are required.

In the sheet stacking method of this example, a plurality of sheet type layers, on which the shaping material is disposed according to the cross-sectional data of the shaping object, is sequentially stacked from the bottom to the top while adhering the sheets to each other, so as to fabricate a three-dimensional object (shaped product) including the shaping object. In the case of the shaping object in FIG. 1, 10 sheets (sheet a), 50 sheets (sheet b), 50 sheets (sheet c), 30 sheets (sheet d) and 8 sheets (sheet e) are sequentially stacked on a platform (not illustrated) from the bottom to the top. The arrow Z in FIG. 2A indicates the stacking direction (bottom to top) in this case. The sheets are adhered to each other by a method that uses heat, or by using a solvent which dissolves the shaping material.

The structure 10 of the shaped product formed like this has a shape illustrated in FIG. 2A. In FIG. 2A, each stacked layer is illustrated, but in an actual structure, the layers are integrated and in many cases the boundaries thereof cannot be recognized. The overhanging portions 11 in FIG. 2A, where the upper sheets extend from the lower sheets in the horizontal direction, must be supported in some way, otherwise the structure may be deformed, and proper stacking may not be performed.

Therefore a support is disposed in a region 12 to support such an overhanging portion 11 (hereafter called "support required region") during stacking. In FIG. 2B, the hatched portions are the support required regions 12.

When each sheet is stacked as illustrated in FIG. 1, the support is disposed in the support required region which is located on the same plane as the sheet to be stacked, whereby a shaped product, where the overhanging portion is supported by the support, is formed. Then the support is removed from the shaped product with only the structure remaining, and as a result, the shaping object is completed.

This example is characterized in that the support does not have the same structure as in the prior art, but the type of support to be disposed in each support required region is determined according to the load that is applied from the top to each layer. The load applied from the top that is considered here is the load of the structure and the support. This example is also characterized in the method of determining the type of the support to be disposed in the support required region according to the value of the load applied from the top. Here the support can be selected from a plurality of types having different strength values (load resistance values). The strength is determined by the structure, material or the like of the support, hence each support may be classified into types by structure, material or the like, but in this example, an example of determining the structure of the support as the type of the support will be described. Different types of support having the same strength may be provided as choices. If a support can be chosen from the supports constituted by different materials but which have the same strength, then a support constituted by an appropriate material can be selected depending on the material used for the structure and the subsequent support removal step. Supports having the same strength but different colors may be provided as choices. Further, in order to change the strength of each support, supports which are different only in the structure of the support may be provided as choices, or supports which are different only in the material of the support may be provided as choices, or supports which are different in both the structure and material of the support may be provided as choices.

Figure 3:
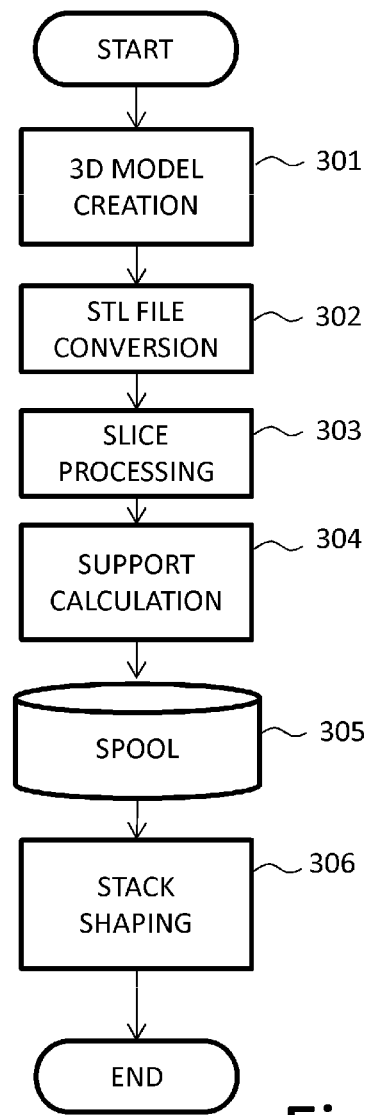
FIG. 3 is a flow chart depicting general processing when a shaped product is formed in a three-dimensional shaping apparatus of Example 1.

FIG. 3 is a flow chart depicting the general processing when a shaped product is formed in a three-dimensional shaping apparatus of this example. This processing is executed by an information processing apparatus that is integrated into or connected to the three-dimensional shaping apparatus.

Step 301 is a modeling step of 3D data of a shaping object. The modeling is a step of creating a structure model or parts using three-dimensional model creation software, such as 3D-CAD, 3D-CG and 3D-Scanner. Here data is created and saved in a file format corresponding to the software requirements.

Step 302 is a step of converting the data of the modeling software into an STL (Stereo Lithography) file. STL is a well known format to represent a three-dimensional shape, which has been used for an optical shaping apparatus or the like, and to express the surface of the shaped product using triangles. The data is constituted by three vertex coordinate values and a normal vector of a triangulated surface.

Step 303 is a slice processing step of acquiring cross-sectional data to represent a cross-section of the shaping object in each layer, in order to generate the slide data of a target layer, which is a layer to be the object of data generation at a certain point in time. Here the slice data is data to be used when the shaped product is formed.

This is a step of calculating cross-sectional shapes when the shaped product represented by STL is sectioned by XY planes, which are perpendicular to the layer stacking direction and exist at a predetermined interval. In this step, a binary bit map image that indicates the inside and outside of the shaping object is basically acquired as the cross-sectional data.

Step 304 is a support calculation step. In this processing, a processing to determine the structure of a support (a sheet in this example) to fill the support required region is performed, and the slice data of the target layer is generated based on the cross-sectional data of the target layer and the determined structure of the support (details described later). For the slice data of the target layer, image data, including a structure region indicating the cross-section corresponding to the target layer of the shaping object and a support region indicating the cross-section of the support, is generated.

Step 305 is a step of spooling the generated slice data of each layer to the storage unit, where the sequentially generated slice data from the top to the bottom of the shaped product is stored.

Step 306 is a step of forming each layer using the slice data, and is a shaping step of fabricating a three-dimensional object (shaped product) by stacking layers sequentially from the bottom to the top.

In this example, a method, in which the slice data is generated sequentially from the top to the bottom and the slice data is then spooled and layers are stacked from the bottom to the top, will be described. The present invention, however, is not limited to this method.

Figure 4:
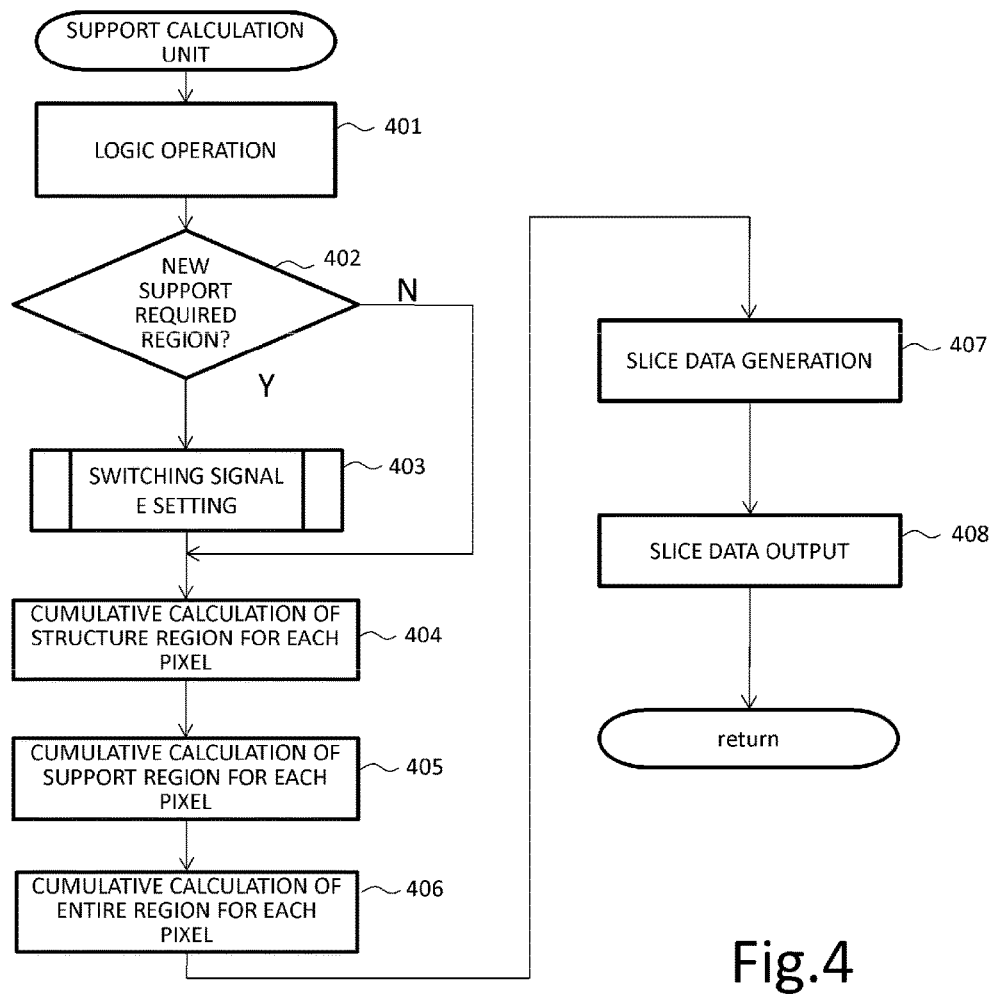
FIG. 4 is a flow chart depicting a support calculation step of Example 1.

The support calculation step in step 304 of FIG. 3 will now be described with reference to FIG. 4 to FIG. 9. FIG. 4 is a flow chart depicting the support calculation step. In FIG. 4, a case of determining the support structure for each support required region will be described.

Step 401 in FIG. 4 is a step of performing a logic operation. In this example, the slice data is sequentially generated from the top to the bottom. In step 401, the logic operation is performed based on the cross-sectional data of the target layer and the stored slice data of the layer directly above the target layer (upper layer slice data).

By this logic operation, the presence/absence of the support required region in the target layer can be judged, and if the support required region is present, a load correspondence value, that indicates the magnitude of the load applied to the support required region from the top, can be determined.

Now the logic operation performed in step 401 will be described with reference to FIG. 5 and FIG. 6.

Figure 5:
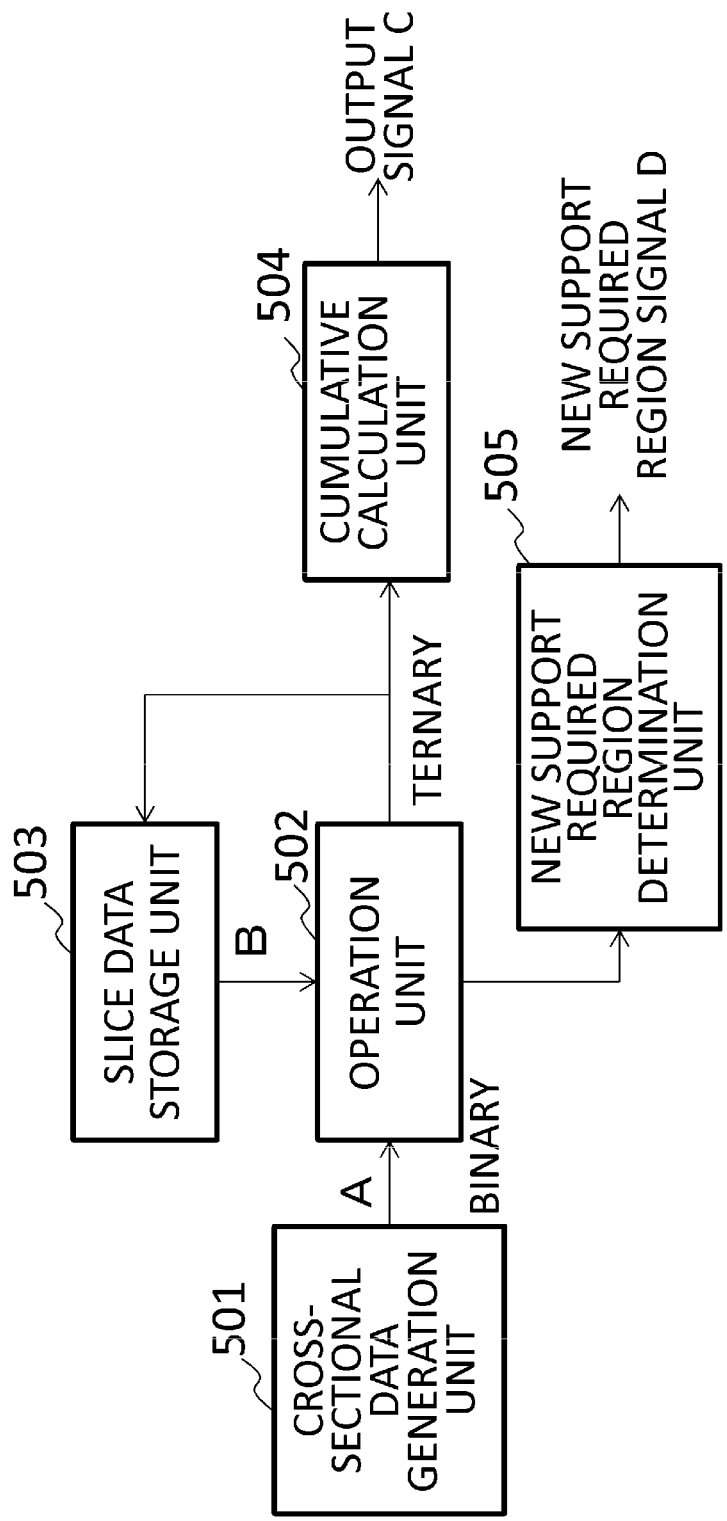
FIG. 5 is a block diagram depicting a logic operation of Example 1.
Figure 6:
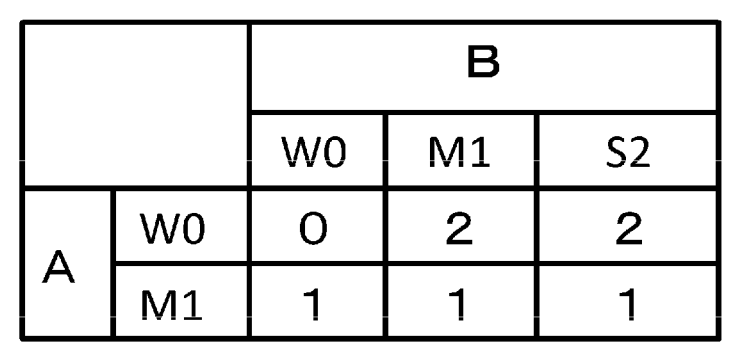

FIG. 5 is a block diagram depicting the logic operation, and FIG. 6 shows an operation table used when the operation unit 502 in FIG. 5 performs the logic operation.

A cross-sectional data generation unit 501 shown in FIG. 5 generates cross-sectional data of a shaping object. A slice data storage unit 503, which functions as a storage unit, buffers slice data.

The operation unit 502 performs the logic operation using the operation table in FIG. 6 for each pixel that vertically overlaps between the cross-sectional data generated by the cross-sectional data generation unit 501 and the slice data buffered by the slice data storage unit 503. Here a case of performing the logic operation for pixel A of the cross-sectional data and pixel B of the slice data which vertically overlaps with pixel A, will be described. In this case, pixel B is located directly above pixel A. Here a pixel refers to a unit area for which logic calculation is performed. For example, a region of one particle may be a pixel, or a region constituted by a plurality of particles may be a pixel.

After the logic operation, the operation unit 502 outputs ternary output signal C with "no material: 0", "structure: 1" or "support: 2" based on pixel A of the cross-sectional data. If the "support: 2" signal is generated, this means that a support required region is present. Thereby ternary slice data, including information on the support required region, can be generated based on the cross-sectional data, which is a binary image.

The logic operation performed by the operation unit 502 will now be described with reference to FIG. 6.

The operation unit 502 performs the logic operation for each pixel that vertically overlaps between the pixels A of the cross-sectional data generated by the cross-sectional data generation unit 501 and the pixels B of the slice data buffered in the slice data storage unit 503. The meaning of each symbol in FIG. 6 follows: "W0" denotes no material region, "M1" denotes a structure region, and "S2" denotes a support region. No material region denoted by "W0" is a region outside the structure region "M1" in the cross-sectional data, and a region outside the structure region "M1" and outside the support region "S2" in the slice data.

In FIG. 6, "no material: 0" is outputted by the operation unit 502 when pixel A is "W0" and pixel B is "W0". When pixel A is "W0" and pixel B is "M1", which means that this is an overhanging portion, "support: 2" is outputted. The timing when pixel A is "W0" and pixel B is "M1" is a switching timing from structure to the support, therefore a new support required region signal D is generated by a new support required region determination unit 505 in FIG. 5 at this timing.

"support: 2" is outputted when pixel A is "W0" and pixel B is "S2". If "support: 2" is continuously outputted in the logic operation for a pixel which vertically overlaps with pixel A and is located below pixel A after "support: 2" is outputted for pixel A, this means that the support required region is continuously present.

When pixel A is "M1", "structure: 1" is outputted whether pixel B is "W0" or "M1". When pixel A is "M1" and pixel B is "S2", "structure: 1" is outputted. The support is switched to the structure at this timing.

Here description of the flow chart in FIG. 4 continues.

Step 402 is a step of judging whether pixel A in the cross-sectional data is a new region that requires support, based on the operation result by the operation unit 502 in FIG. 5 in step 401. As mentioned above, when pixel A is "W0" and pixel B is "M1", a new support required region determination unit 505 in FIG. 5 outputs the new support required region signal D, and it is determined that pixel A is a new support required region in step 402. If it is determined that this pixel A is a new support required region in step 402 (Y in step 402), processing advances to step 403.

Step 403 is a step of setting a switching signal E.

If each pixel is determined as a new support required region in step 402, the structure of the support is determined according to a load correspondence value, which is cumulatively calculated as mentioned later, and the signal to switch the support structure is set in step 403. In other words, if the load correspondence value is smaller than the set value, the switching signal E, to switch to the support structure 1, is set, and if the load correspondence value is the set value or more, the switching signal E, to switching to the support structure 2, of which strength is higher than the support structure 1, is set.

This point will be described with reference to FIG. 7.

Figure 7:
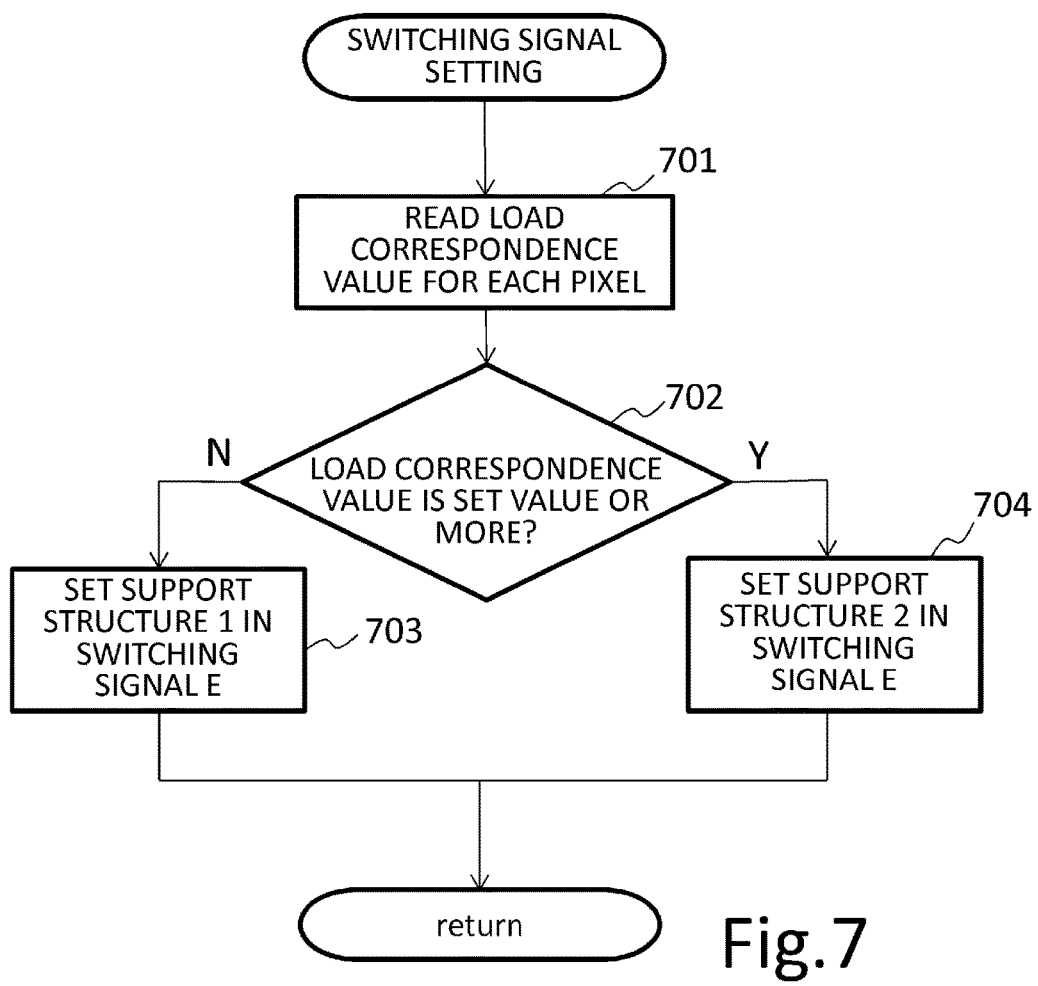
FIG. 7 is a flow chart depicting the switching signal setting of Example 1.

FIG. 7 is a flow chart depicting the switching signal setting in step 403.

Step 701 is a step of reading the load correspondence value of each pixel, where the load correspondence value of each pixel is read at a timing when the new support required region signal D in FIG. 5 is outputted.

Step 702 is a step of judging the magnitude of the load correspondence value. If the load is heavy, that is, if the load correspondence value is a set value or more (Y in step 702), the support structure must be strengthened, hence the switching signal E, to select the support structure 2, is set (step 704). And if the load is light, that is, if the load correspondence value is less than the set value (N in step 702), the switching signal E, to select the support structure 1, is set (step 703).

Here the support structure is classified by the strength of the support, as mentioned above, and the set value of the load correspondence value can be appropriately set in advance according to the strength of the material of the support and of the support structure. In this example, two types of support structure (support structure 1 and support structure 2) are used as the support structure of the support, and in this case, the support structure 2 is designed as a structure which can withstand the load correspondence value even if the support structure is disposed on the lowest surface of the shaping object. The support structure 1 has a structure to withstand half of the load correspondence value of the support structure 2, for example. However, the present invention is not limited to this, and three or more types of support structures may be used. As the number of types of support structures increases, the effect of reducing consumption of materials of the support increases.

In this example, one type of material is used for the support, but the present invention is not limited to this, and a plurality of types of support, constituted by materials having different characteristics, may be used. When such supports are used, the shape of the support structure may be different depending on the material. For example, in the case of material A, the support structure 1 and the support structure 2 are switched depending on whether the load correspondence value is less than the set value or not, and in the case of material B, a support structure 3 and a support structure 4, which are different from support structures 1 and 2, are switched depending on whether the load correspondence value is less than the set value or not. In this case, the load correspondence value may be set according to the type of material of the support and type of support structure. A characteristic of the material of the support is, for example, that it can be manually removed or removed by dissolving using solvent.

In this example, a value determined by cumulatively calculating the load for each vertically overlapping pixel is used as the load correspondence value, but the load correspondence value of the present invention is not limited to this. For example, the distance from the highest level of the shaped product may be considered as the load correspondence value.

Figure 9:
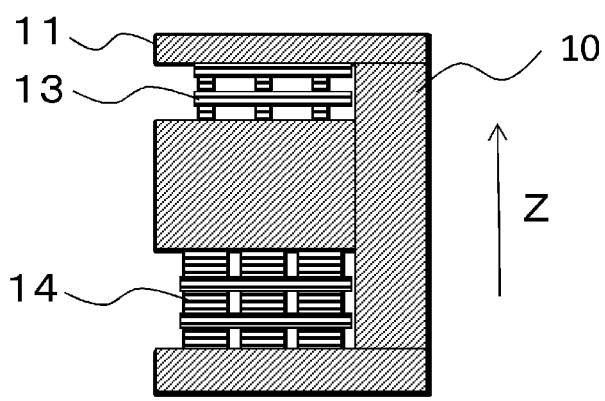
FIG. 9 is a diagram depicting the support structure of Example 1.

Now the switching signal setting examples in step 703 and step 704 will be described. FIG. 9 is a diagram depicting an example of forming supports having mutually different support structures in the support required regions which are separated from each other by the structure. FIG. 9, however, is just an example, and if there are three or more support required regions separated from one another by the structure, then supports having a same support structure may be included. In other words, when the shaped product has a plurality of supports separated from one another by the structure, at least two supports, out of a plurality of supports, are formed to have mutually different support structures.

An example of a simple method for setting the switching signal follows. First a support structure for one support required region, including a plurality of pixels, is set to the support structure 1, which corresponds to the case when the load correspondence value is less than a set value. Then if the cumulative load correspondence value calculated in any pixel, out of the pixels of the support required region, becomes the set value or more, all the pixels of this support required region are switched to the support structure 2, which corresponds to the case when the load correspondence value is the set value or more. Then in the case of the structure 10 shown in FIG. 9, the upper support required region becomes the support 13 having the support structure 1, and the lower support required region becomes the support 14 having the support structure 2.

In step 703 and step 704, information to set to the support structure 1 or support structure 2, depending on the judgment in step 702, may be recorded for each pixel, instead of setting the switching signals. If it is configured to generate the slice data using the signals based on four values like this, the slice data can be generated without setting the switching signals.

In the case of recording information on whether the support structure 1 is set or the support structure 2 is set for each pixel like this, the support structure may be set as follows. The judgment is performed in step 702 for a plurality of pixels respectively constituting one support required region, but a case when the judgment result is Y and a case when the judgment result is N may coexist in the result, and in this case, both the structure 1 and structure 2 are set as the support structure of the support required region. If this occurs, the support structure 2 having higher structure strength is set with priority as the support structure of this support required region.

Further, in the support structure of the support, the shape of the support structure 2 may include the shape of the support structure 1. In other words, the shape of the support structure 2 may be formed in such a manner that the shape of the support structure 1 is reinforced. Then even if the support structure 1 and the support structure 2 are set for adjacent pixels, a continuous support structure can be maintained between the support structure 1 and the support structure 2. As a consequence, even if the support structure 1 and the support structure 2 coexist in the support structure of one support required region, which includes a plurality of pixels, the function of the support can be demonstrated with more certainty. An example of the above mentioned case when the support structure 1 and the support structure 2 coexist is a case when a judgment error occur when the support structure is judged.

Here description on the flow chart in FIG. 4 continues.

If the result in step 402 is N, in other words, if it is judged that pixel A in the cross-sectional data is not a new support required region, processing advances to step 404. And if pixel A is "W0" and pixel B is "S2" in FIG. 6, a support having a same support structure as the support structure of the support disposed in pixel B of the slice data is set as the support region.

Step 404 to step 406 are steps of performing cumulative calculation. This cumulative calculation is performed by the cumulative calculation unit 504 in FIG. 5. The cumulative calculation unit 504 performs the cumulative calculation in the vertical direction for each vertically overlapping pixel based on ternary output signal C as described below, which is outputted from the operation unit 502, and stores the value.

Step 404 is a cumulative calculation step in the structure region "M1" for each pixel, where the load correspondence value, which has been integrated, is determined for each vertically overlapping pixel.

Step 405 is a cumulative calculation step in the support region "S2" for each pixel, where the load correspondence value, which has been integrated, is determined for each vertically overlapping pixel. The sequence of step 404 and step 405 may be reversed.

Step 406 is a cumulative calculation step in the entire region for each pixel, where the sum of the load correspondence value of the structure region "M1" and the load correspondence value of the support region "S2" is calculated and regarded as the load correspondence value of each pixel.

Step 407 is a step of generating image data including the structure region "M1" and support region "S2" as the slice data. In this case, the image data corresponding to the support region "S2" is generated by setting the support to the support structure 1 or the support structure 2 according to the switching signal E.

This point will be described with reference to FIG. 8.

Figure 8:
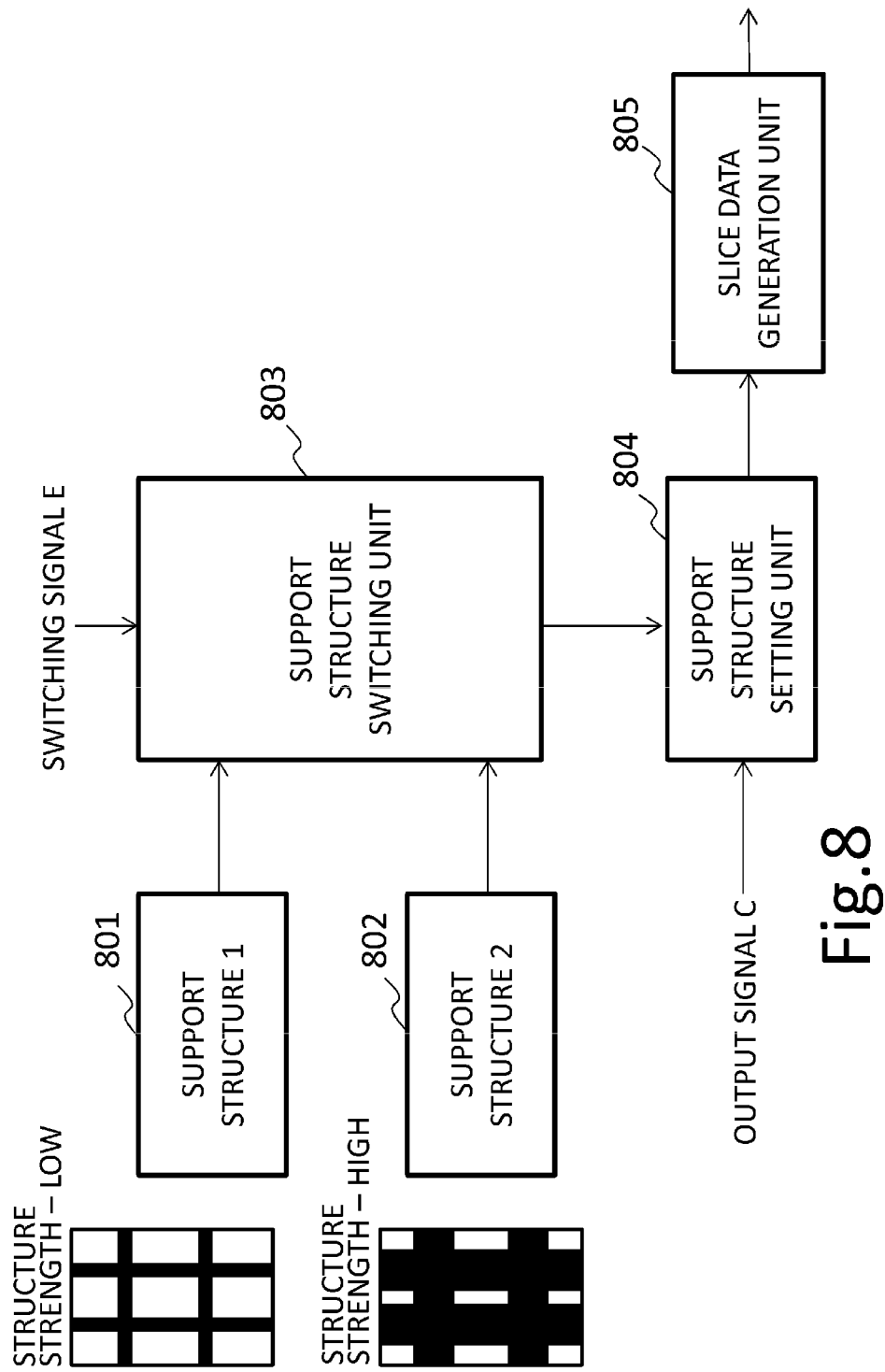
FIG. 8 is a block diagram depicting the support structure switching unit of Example 1.

FIG. 8 is a block diagram of the support structure switching unit.

In FIG. 8, 801 is a pattern generator of the support structure 1, and 802 is a pattern generator of the support structure 2. Each pattern generator generates pixels constituting the pattern of the respective support structure using an internal counter. The support structure 1 has a low structural strength, but this can save material consumption. The support structure 2 has a higher structural strength than the support structure 1, but consumes more material than the support structure 1. In this example, the support structure is a grating pattern, but the support structure of the present invention is not limited to this, and may be a polygonal pattern, such as a hexagon, for example.

The output signal C shown in FIG. 8 is a ternary signal outputted from the operation unit 502 in FIG. 5, and includes information on the support required region.

A support structure switching unit 803 sets the support structure to either the support structure 1 or the support structure 2 according to the switching signal E.

Then a support structure setting unit 804 sets the support region "S2" included in the output signal C to the support structure which is set by the support structure switching unit

803. Then a slice data generation unit 805 generates slice data that includes the structure region "M1" and the support region "S2".

In the support structure 1 and 2 shown in FIG. 8, the difference of the thickness of the walls in the grating (mesh) structure is depicted as two-dimensions, but in a three-dimensional display the support structures 1 and 2 are grids with walls. If such a grating type support structure is used, a "no material" region may exist when the shaped product including the support is formed, depending on the position, even if the region is the support region "S2" in the slice data.

Step 408 is a step of outputting the slice data generated in step 407.

FIG. 4 is a flow performed for one sheet of the cross-sectional data in a target layer. By executing the flow in FIG. 4 for each cross-sectional data sliced in step 303, the slice data, including the structure region and the support region, is outputted for the entire shaping object, and is stored in the spool unit 305.

As described above, this example is configured such that the structure of the support to be disposed in a support required region is different depending on the magnitude of the load applied from the top to the support required region. Thereby the consumption of materials of the support can be reduced while preventing deformation of the shaping object during fabrication.

In the description of this example, one type of material is used to form the shaping object, but the present invention is not limited to this, and can be suitably applied even to the case of using a plurality of types of materials to form the shaping object. The plurality of types of materials include materials having different quality or materials having different colors. When a plurality of types of materials is used to form the shaping object, it is preferable that the logic operation is performed to output multi-valued slice data corresponding to the number of types of materials to be used.

Example 2

Example 2 will now be described. In this example, only components that are different from Example 1 will be described, and description of components the same as Example 1 is omitted.

In Example 1, the case of determining the support structure in support required region units was described, but in this example, a case of switching the support structure within one support required region will be described. In concrete terms, in a support required region in the lower part of the shaping object in FIG. 9, the support portion above the layer, which includes a pixel of which load correspondence value from the top is a set value or more, is switched to the support structure 1, and the support portion below this layer is switched to the support structure 2.

The general processing flow when the shaped product is formed according to this example is the same as FIG. 3, but the support calculation step 304 of this example is different from FIG. 4.

Figure 10:
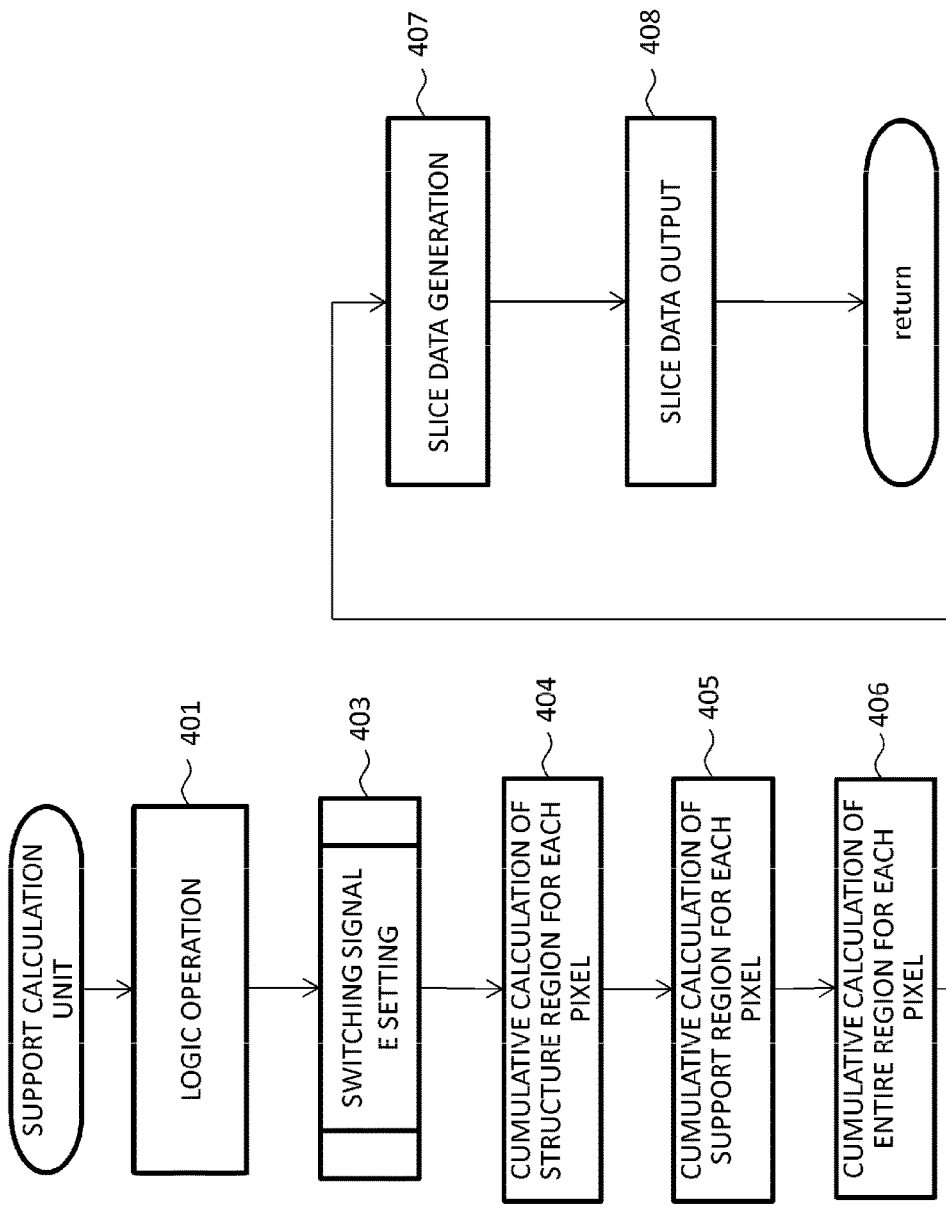
FIG. 10 is a flow chart depicting the support calculation step of Example 2.

FIG. 10 is a flow chart depicting the support calculation step 304. In the flow chart in FIG. 10, step 402, which judges whether the region is a new support required region, is not included. By not performing step 402, the support structure can be switched before and after the layer which includes a pixel of which load correspondence value applied from the top is the set value or more within the support required region.

In the case of this example, the support structure is switched in the middle of the support required region, hence the support structure 1 and the support structure 2 must be continuous at the switching timing. For example, the support structures can easily be continuous if the pitches of the structure in the layer stacking direction are matched, as in the case of the support structure 1 and the support structure 2 shown in FIG. 8, but other methods may be used if continuity can be implemented.

According to this example, the support structure is switched depending on whether the load correspondence value applied from the top is the set value or more, hence a support structure, of which structural strength is unnecessarily high, need not be used. As a consequence, consumption of materials of the support can be reduced while preventing deformation of the shaping object during fabrication.

Example 3

Example 3 will now be described. In this example, only components that are different from Example 2 will be described, and description of components the same as Example 2 is omitted.

This example is characterized in that the support structure is changed in the middle of the support considering the length of the support in the layer stacking direction (vertical direction). For example, this example is used when the vertical length of the space under the overhanging portion of the structure is long, or when the structure has an inverted pyramid shape, that is, when the support required region is continuously present in the layer stacking direction.

In this example, a count function, which counts for each pixel how long the support required region continues is used, and the support structure is changed at either a timing when the count value becomes a set value or more, or at a timing when the load correspondence value applied from the top becomes a set value or more.

In concrete terms, the count function counts the length of the vertically continuous support required region from the highest level.

Figure 11:
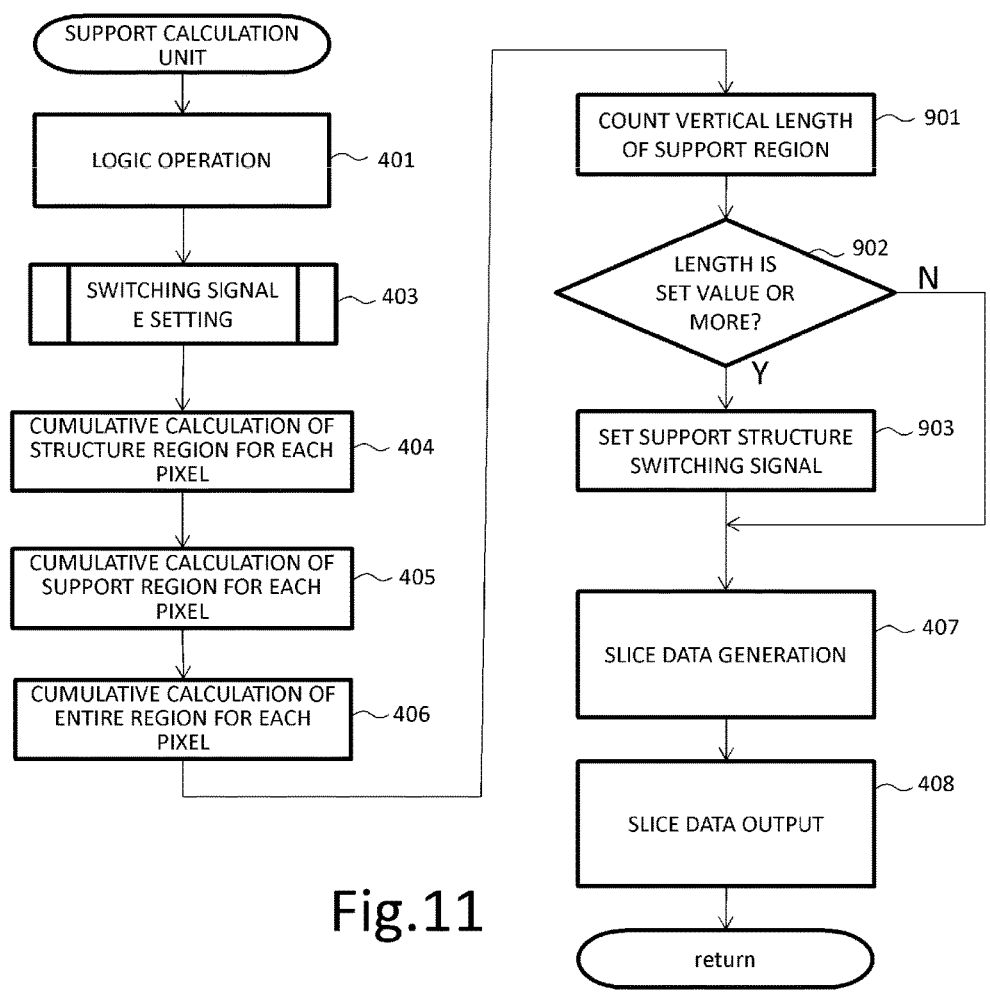
FIG. 11 is a flow chart depicting the support calculation step of Example 3.

FIG. 11 is a flow chart depicting the support calculation step of this example, and the steps denoted with numbers in the 900s related to the counter function are added to the flow chart in FIG. 10 of Example 2. Only the added steps will be described here.

Step 901 is a step of counting the length of the vertically continuous support required region from the highest level.

Step 902 is a step of judging whether the length of the vertically continuous support required region from the highest level is a set value or more. If it is judged in step 902 that the length of the vertically continuous support required region from the highest level is the set value or more, the signal to switch the support structure to the support structure having higher strength is set in step 903, even if the load correspondence value applied from the top does not exceed the set value. Thereby the support structure can be changed in the middle of the support, as shown in FIG. 12A and FIG. 12B.

Figure 12A:
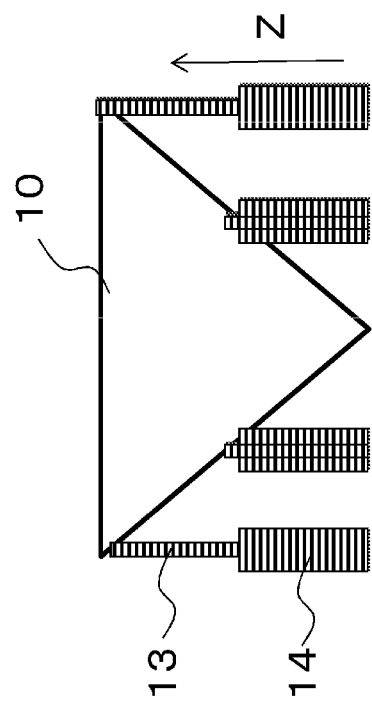
FIGS. 12A and 12B are diagrams depicting the support structure of Example 3.
Figure 12B:
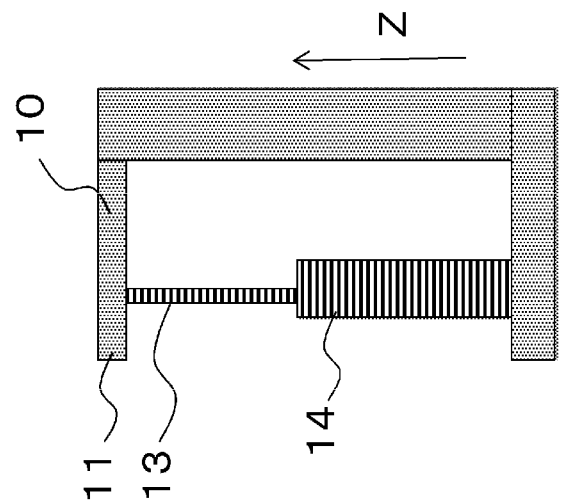

FIG. 12A and FIG. 12B are diagrams depicting the support structure of this example, where FIG. 12A shows a case when the structure 10 is inclined, and FIG. 12B shows a case when the vertical length of the space under the overhanging portion of the structure 10 is long. In both cases, the support structure 1 is used for the upper part of the support required region, and the support 14 having the support structure 2, of which strength is higher than the support 13 having the support structure 1, is used for the lower part thereof.

As described above, in this example, the support structure can be switched in the middle of the support considering the vertical length of the support, whereby the strain caused by a lengthy continuation of a weak structure can be prevented. As a result, consumption of materials of the support can be reduced while preventing deformation of the shaping object during fabrication more effectively than Example 2. The configuration of this example can be applied to Example 1 in the same manner.

Example 4

In this example, a case of applying pressure during stacking will be described. In this example, only components that are different from Example 1 to 3 will be described, and description of the components the same as Examples 1 to 3 is omitted.

Figure 13:
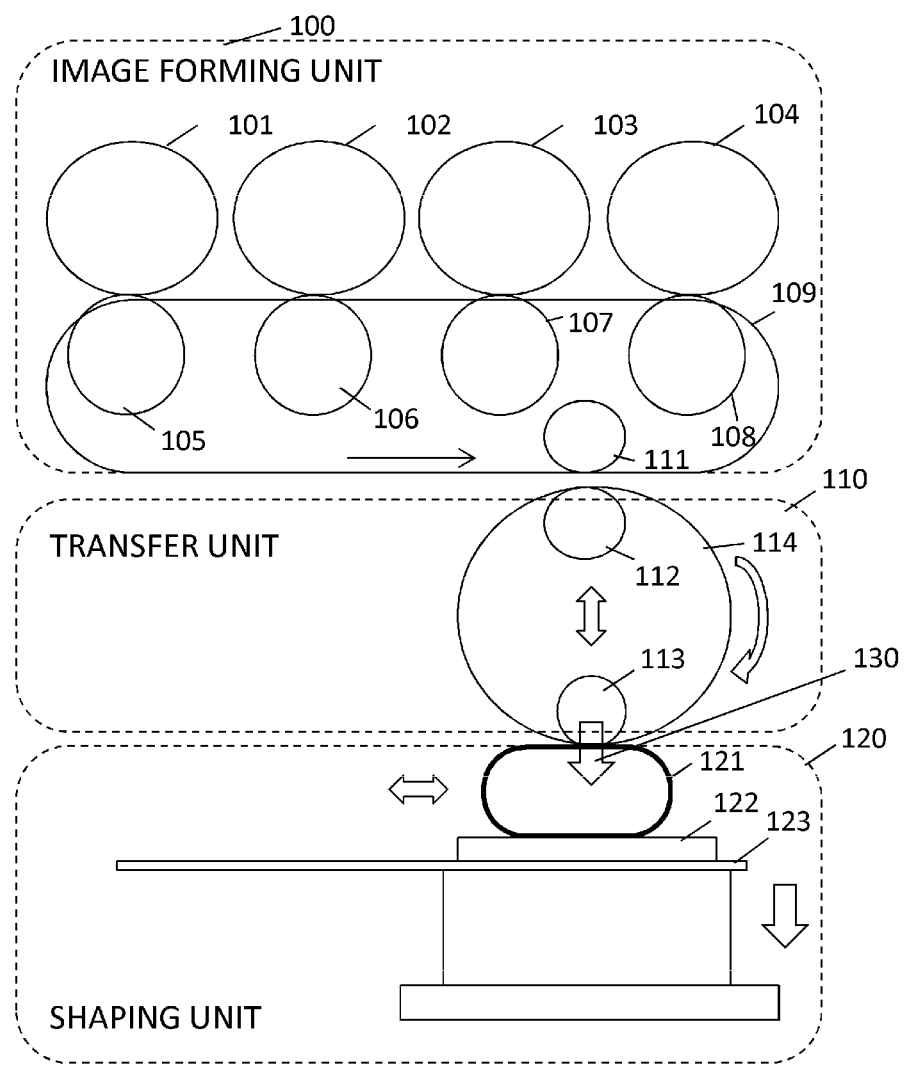
FIG. 13 is a diagram depicting a method of forming a shaped product using the image forming unit of Example 4.

FIG. 13 is a diagram depicting a shaping apparatus that is used for shaping in this example. In the shaping apparatus, an image forming unit 100 disposes shaping materials and forms images to be the layers by an electrophotographic system, based on the slice data generated by the slice data generation unit 805 described in Examples 1 to 3.

In the image forming unit 100, a photosensitive drum 101 for particles 1, a photosensitive drum 102 for particles 2, a photosensitive drum 103 for particles 3, and a photosensitive drum 104 for particles 4 are disposed along the rotating direction of an endless transfer belt 109. A transfer roller 105 for particles 1, a transfer roller 106 for particles 2, a transfer roller 107 for particles 3, and a transfer roller 108 for particles 4 are disposed so as to face each photosensitive drum via the transfer belt 109.

In the image forming operation process by the image forming unit 100, images are formed on the photosensitive drums 101 to 104 by being exposed by an optical system and receiving supplied shaping materials. Then the image formed on each photosensitive drum is transferred to the transfer belt 109 that is held between each photosensitive drum and each transfer roller, and the image is formed on the transfer belt 109.

A transfer unit 110 is for transferring an image formed on the transfer belt 109 in the image forming unit 100 to a transfer belt 114 using a transfer roller 111 on the image forming unit side and a transfer roller 112 on the transfer unit side.

In the transfer unit 110, the image transferred to a transfer belt 114 is thermally welded by a heater 113 to a stack shaping object 121 on a stacking stage 122 in a shaping unit 120. The stacking stage 122 is configured to move a stage moving base 123 synchronizing with the transfer belt 114 during thermal welding. The stage moving base 123 is also configured to be able to descend in the arrow direction according to the stacking thickness.

In this example, the shaping material is described as particles 1 to 4, but the support structure can be shaped if one type, out of particles 1 to 4, is used as the material of the support.

If there is a difference between the descending amount of the stage moving base 123 and the actual stacking thickness, force in the rotation direction may be applied from the transfer belt 114 to the stack shaping object 121 being formed, when layers are stacked to form the shaped product. The horizontal component of this force in the rotation direction becomes a shearing force, and the vertical component of this force becomes a compressive force 130, hence if such force in the rotation direction is applied to the stack shaping object 121, the support may not be able to appropriately support the shaped product, even if the support structure determined by the cumulative calculation in Example 1 is applied to this example.

Therefore in this example, the cumulative calculation is performed by adding a value, which corresponds to the compressive force 130 to be applied to the stack shaping object 121, to the load correspondence value described in Example 2.

In this example, the value corresponding to the compressive force 130 is added to the load correspondence value for each pixel in the cumulative calculation step for each pixel in step 406 in FIG. 11, as described in Example 2. By this method, the cumulative calculation considering the compressive force 130 can be easily formed.

This compressive force (pressure) 130 can be estimated by constantly or periodically measuring the error between a detected value by a stacking height sensor (not illustrated) and a stacking set value. If the transfer belts are wound around rollers, the compressive force 130 can also be estimated by the output of a rotation axis strain sensor or the like.

As described above, in this example, the value generated by adding the value corresponding to the compressive force, which is applied to the stack shaping object being formed, to the load correspondence value described in Example 1, is used as the magnitude of the load which is applied to the support required region from the top. The structure of the support to be disposed in the support required region is changed depending on this magnitude. Thereby consumption of materials of the support can be reduced while preventing deformation of the shaping object during fabrication more effectively than Example 2. The configuration of this example can also be applied to the configuration of Example 1 or Example 3 just the same.

In the description of this example, each layer is formed using an electrophotographic system as the image forming unit 100, but an ink jet system may be used as well.

Further, in the description of the above embodiments, the shaping materials are stacked in plane units, but the present invention is not limited to this method. The present method may be applied to a shaping method for generating slice data and forming the supports in the support required region, such as fused deposition modeling (FDM) and an optical shaping method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the aboved-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-243320, filed on Dec. 1, 2014, which is hereby incorporated by reference herein in its entirety.

The invention claimed is:

1. An information processing method for generating slice data in a shaping apparatus configured to manufacture a three-dimensional object including a shaping object by sequentially stacking shaping materials based on the slice data generated and stored to a storage unit for each layer, the information processing method comprising the steps of:
    acquiring cross-sectional data on a cross-section corresponding to a target layer of the shaping object in order to generate the slice data of the target layer;
    judging the presence/absence of a support required region, which requires a support for supporting the shaping object, in the target layer, based on (a) the cross-sectional data of the target layer, and (b) upper layer slice data, which is the slice data of a layer directly above the target layer and which is stored in the storage unit;
    determining, when the support required region is present in the target layer, a type of the support to be disposed in the support required region according to a load correspondence value which indicates the magnitude of a load applied from the top; and
    generating, as the slice data of the target layer, image data including a structure region indicating the cross-section of the shaping object in the target layer and a support region indicating the cross-section of the support, based on the cross-sectional data and the determined type of the support.

2. The information processing method according to claim 1, wherein the shaping materials are sequentially stacked from the bottom to the top, and the slice data is sequentially generated from the top to the bottom.

3. The information processing method according to claim 1, wherein in the judging step, it is judged that the support required region is present in the target layer when a point is located outside the cross-section of the shaping object in the target layer, and a point located directly above this point in the upper layer slice data is located inside the structure region or the support region.

4. The information processing method according to claim 3, wherein in the determining step, when a region located directly above the support required region in the upper layer slice data is a structure region, the type of the support to be disposed in the support required region is determined according to the load correspondence value, and when a region located directly above the support required region in the upper layer slice data is a support region, a support of the same type as the support disposed in this support region, is set.

5. The information processing method according to claim 1, wherein the type of the support is classified by a strength of the support, and
    wherein in the determining step, the strength of the support of the type to be determined when the load correspondence value is a predetermined set value or more is higher than the strength of the support of the type to be determined when the load correspondence value is smaller than the set value.

6. The information processing method according to claim 1, wherein the type of the support is classified by a strength of the support, and
    wherein when the support required region is continuously present in a vertical direction, the strength of the support of the type to be disposed in the support required region of which a length from the highest level of the support required region is a predetermined set value or more is higher than the strength of the support of the type to be disposed in the highest level of the support required region.

7. The information processing method according to claim 1, wherein when the shaping apparatus is configured such that compressive force is applied to a three-dimensional object being manufactured when the shaping materials are stacked, the load correspondence value includes a value corresponding to the compressive force.

8. The information processing method according to claim 1, wherein the shaping apparatus stacks the shaping materials in plane units.

9. The information processing method according to claim 8, wherein the shaping apparatus includes an image forming unit configured to form each layer based on the slice data.

10. The information processing method according to claim 9, wherein the image forming unit forms each layer using an electrophotographic system.

11. An information processing apparatus for generating slice data in a shaping apparatus configured to manufacture a three-dimensional object including a shaping object by sequentially stacking shaping materials based on the slice data generated and stored to a storage unit for each layer, the information processing apparatus comprising:
    an acquiring unit configured to acquire cross-sectional data on a cross-section corresponding to a target layer of the shaping object in order to generate the slice data of the target layer;
    a judging unit configured to judge the presence/absence of a support required region, which requires a support for supporting the shaping object, in the target layer, based on (a) the cross-sectional data of the target layer, and (b) upper layer slice data, which is the slice data of a layer directly above the target layer and which is stored in the storage unit;
    a determining unit configured to, when the support required region is present in the target layer, determine a load correspondence value which indicates the magnitude of a load applied from the top, and determine a type of the support to be disposed in the support required region according to the load correspondence value; and
    a generating unit configured to generate, as the slice data of the target layer, image data including a structure region indicating the cross-section of the shaping object in the target layer and a support region indicating the cross-section of the support, based on the cross-sectional data and the determined type of the support.

12. A method for manufacturing a three-dimensional object including a shaping object by sequentially stacking shaping materials based on slice data generated and stored to a storage unit for each layer,
wherein the generating the slice data comprises the steps of:
(1) acquiring cross-sectional data on a cross-section corresponding to a target layer of the shaping object in order to generate the slice data of the target layer;
(2) judging the presence/absence of a support required region, which requires a support for supporting the shaping object, in the target layer, based on (a) the cross-sectional data of the target layer, and (b) upper layer slice data, which is the slice data of a layer directly above the target layer and which is stored in the storage unit;
(3) determining, when the support required region is present in the target layer, a load correspondence value which indicates the magnitude of a load applied from the top, and determining a type of the support to be disposed in the support required region according to the load correspondence value; and
(4) generating, as the slice data of the target layer, image data including a structure region indicating the cross-section of the shaping object in the target layer and a support region indicating the cross-section of the support, based on the cross-sectional data and the determined type of the support.

13. A three-dimensional shaping apparatus for manufacturing a three-dimensional object including a shaping object by sequentially stacking shaping materials based on slice data generated and stored to a storage unit for each layer, the three-dimensional shaping apparatus comprising:
a slice data generating unit configured to generate the slice data,
wherein the slice data generating unit includes:
(1) an acquiring unit configured to acquire cross-sectional data on a cross-section corresponding to a target layer of the shaping object in order to generate the slice data of the target layer;
(2) a judging unit configured to judge the presence/absence of a support required region, which requires a support for supporting the shaping object, in the target layer, based on (a) the cross-sectional data of the target layer, and (b) upper layer slice data, which is the slice data of a layer directly above the target layer and which is stored in the storage unit;
(3) a determining unit configured to, when the support required region is present in the target layer, determine a load correspondence value which indicates the magnitude of a load applied from the top, and determine a type of the support to be disposed in the support required region according to the load correspondence value; and
(4) a generating unit configured to generate, as the slice data of the target layer, image data including a structure region indicating the cross-section of the shaping object in the target layer and a support region indicating the cross-section of the support, based on the cross-sectional data and the determined type of the support.

14. An information processing method comprising:
generating slice data for use in manufacturing a three-dimensional object including a shaping object by sequentially stacking shaping materials from bottom to top based on the slice data generated for each layer; and
storing the slice data to a storage unit,
wherein the generating comprises (a) judging the presence/absence of a support required region for a target layer, which is one layer in the slice data, based on slice data, stored in the storage unit, of a layer directly above the target layer, (b) determining, when the support required region is present in the target layer, a type of a support to be disposed in the support required region according to a load correspondence value which indicates the magnitude of a load applied from the top, and (c) generating, as the slice data of the target layer, image data including (i) a structure region indicating a cross-section of the shaping object in the target layer and (ii) a support region indicating a cross-section of the support, based on cross-sectional data and the determined type of the support, and
wherein the slice data is sequentially generated from top to bottom.

15. The information processing method according to claim 14, wherein the type of the support is classified by a strength of the support, and
wherein when the support required region is continuously present in a vertical direction, the strength of the support of the type to be disposed in the support required region of which a length from the highest level of the support required region is a predetermined set value or more is higher than the strength of the support of the type to be disposed in the highest level of the support required region.

* * * * *